(12) United States Patent
Lorenzo et al.

(10) Patent No.: US 7,926,870 B2
(45) Date of Patent: Apr. 19, 2011

(54) MODULAR ASSEMBLY FOR A VEHICLE

(75) Inventors: Luis Lorenzo, Plymouth, MI (US); David L. Chapman, Lake Orion, MI (US); Ashish Vijay Kotnis, Rochester Hills, MI (US)

(73) Assignee: Dow Global Technologies LLC, Midland, MI (US)

( * ) Notice: Subject to any disclaimer, the term of this patent is extended or adjusted under 35 U.S.C. 154(b) by 639 days.

(21) Appl. No.: 11/747,426

(22) Filed: May 11, 2007

(65) Prior Publication Data

US 2007/0284076 A1 Dec. 13, 2007

Related U.S. Application Data

(60) Provisional application No. 60/803,278, filed on May 26, 2006.

(51) Int. Cl.
*B60R 19/52* (2006.01)
*B62D 25/08* (2006.01)
*B60K 11/04* (2006.01)

(52) U.S. Cl. .................................................. 296/193.1
(58) Field of Classification Search ............. 296/193.1, 296/193.09, 203.02, 187.09; 293/115; 180/68.4, 180/68.6
See application file for complete search history.

(56) References Cited

U.S. PATENT DOCUMENTS

| | | | |
|---|---|---|---|
| 5,154,462 A | 10/1992 | Carpenter et al. | |
| 5,539,070 A | 7/1996 | Zharov et al. | |
| 6,033,095 A | 3/2000 | Ognian et al. | |
| 6,196,624 B1 * | 3/2001 | Bierjon et al. | 296/193.09 |
| 6,216,810 B1 * | 4/2001 | Nakai et al. | 180/68.4 |
| 6,502,653 B1 * | 1/2003 | Balzer et al. | 180/68.4 |
| 6,517,146 B1 * | 2/2003 | Cheron et al. | 296/193.09 |
| 6,547,317 B1 * | 4/2003 | Cheron et al. | 296/193.01 |
| 6,630,555 B2 | 10/2003 | Kendall et al. | |
| 6,632,908 B1 | 10/2003 | Maandi | |
| 6,679,545 B1 * | 1/2004 | Balzer et al. | 296/193.09 |
| 6,681,876 B1 * | 1/2004 | Haneda et al. | 180/68.4 |
| 6,706,831 B2 | 3/2004 | Sonnenschein et al. | |
| 6,710,145 B2 | 3/2004 | Sonnenschein et al. | |
| 6,713,578 B2 | 3/2004 | Sonnenschein et al. | |
| 6,713,579 B2 | 3/2004 | Sonnenschein et al. | |
| 6,715,573 B2 * | 4/2004 | Emori et al. | 180/68.4 |
| 6,729,424 B2 * | 5/2004 | Joutaki et al. | 180/68.4 |
| 6,730,759 B2 | 5/2004 | Sonnenschein et al. | |
| 6,806,330 B1 | 10/2004 | Sonnenschein et al. | |
| 6,814,400 B2 * | 11/2004 | Henderson et al. | 296/193.09 |
| 6,877,797 B2 * | 4/2005 | Henderson et al. | 296/203.02 |
| 6,949,603 B2 | 9/2005 | Sonnenschein et al. | |
| 6,955,393 B2 * | 10/2005 | Staargaard et al. | 296/193.1 |
| 7,008,008 B2 * | 3/2006 | Andre et al. | 296/203.02 |
| 7,287,613 B2 * | 10/2007 | Kim | 180/68.4 |
| 7,571,957 B2 * | 8/2009 | Povinelli et al. | 296/193.09 |
| 7,644,966 B2 * | 1/2010 | Huber et al. | 293/155 |

(Continued)

FOREIGN PATENT DOCUMENTS

EP 0493158 A1 7/1992

(Continued)

*Primary Examiner* — Hilary Gutman
(74) *Attorney, Agent, or Firm* — Dobrusin & Thennisch PC

(57) ABSTRACT

There is disclosed a modular assembly and method of forming the assembly. The assembly is particularly suitable as at least part of a front end of a transportation or automotive vehicle. The assembly preferably includes one or more plastic structures adhesively secured to one or more metal structures.

20 Claims, 4 Drawing Sheets

U.S. PATENT DOCUMENTS

| | | |
|---|---|---|
| 2002/0058764 A1 | 5/2002 | Sonnenschein et al. |
| 2002/0060476 A1* | 5/2002 | Cantineau et al. ............ 296/194 |
| 2002/0084122 A1* | 7/2002 | Emori et al. ................. 180/68.4 |
| 2002/0190542 A1* | 12/2002 | Takeuchi et al. .............. 296/194 |
| 2003/0001410 A1 | 1/2003 | Cate et al. |
| 2004/0046422 A1* | 3/2004 | Igura et al. ............... 296/193.09 |
| 2004/0094976 A1 | 5/2004 | Cate et al. |
| 2005/0004332 A1 | 1/2005 | Jialanella et al. |
| 2005/0035609 A1 | 2/2005 | Cate et al. |
| 2005/0137370 A1 | 6/2005 | Jialanella et al. |

FOREIGN PATENT DOCUMENTS

| | | |
|---|---|---|
| EP | 1216913 A | 6/2002 |
| FR | 2841863 A | 1/2004 |
| WO | WO/0144311 | 6/2001 |
| WO | WO02/092711 | 11/2002 |

\* cited by examiner

U.S. 7,926,870 B2

MODULAR ASSEMBLY FOR A VEHICLE

CLAIM OF BENEFIT OF FILING DATE

The present application claims the benefit of the filing date of U.S. Provisional Application Ser. No. 60/803,278, filed May 26, 2006, hereby incorporated by reference.

TECHNICAL FIELD

The present invention relates to a modular assembly for a vehicle and a method of forming the modular assembly, applying the modular assembly or both. More particularly, the present invention relates to a front end modular assembly for an automotive vehicle and a method of forming the assembly, attaching the assembly to a front portion of the automotive vehicle or both.

BACKGROUND OF INVENTION

Generally, the transportation industry has sought to form innovative modular assemblies for transportation vehicles that address issues such as labor reduction, cost savings, structural integrity, simplicity in the vehicle assembly process, weight reduction combinations thereof or the like. As examples, U.S. Patent Publication Nos. 2003/0001410; 2004/0094976; and 2005/0035609, and U.S. patent application Ser. No. 60/788,131, filed Mar. 31, 2006, all of which are expressly incorporated herein by reference for all purposes, disclose modular assemblies (e.g., a front or rear end modular assembly) suitable for attachment to an automotive vehicle.

While the above mentioned modular assemblies exhibit many desirable characteristics, it can be further desirable for a modular assembly to exhibit other additional, improved or alternative desirable characterisitics. As one example, it can be desirable for a modular assembly to provide greater access to components of an automotive vehicle. It can also be desirable for the modular assembly to be exhibit desirable or improved levels of structural integrity while also exhibiting low or lower weight relative to prior assemblies. As such, the present invention provides a modular assembly, and more particularly a front end modular assembly for a vehicle that exhibits one or more additional, improved or alternative desirable characteristics relative to prior assemblies.

SUMMARY OF THE INVENTION

Accordingly there is disclosed a front end module for an automotive vehicle. The module includes a carrier, a reinforcement member or both. The carrier typically includes a cross-vehicle structure, a first downwardly extending structure and a second second downwardly extending structure. The reinforcement member, when included, is preferably substantially entirely formed of metal material and is attached (e.g., adhesively secured) to the cross-vehicle structure. In one embodiment, the carrier and the reinforcement member cooperatively define an enclosed open space formed between the reinforcement member and the cross-vehicle structure. The carrier member can be configured to suspend a heat exchanger from the first structure, the second structure, the cross-vehicle structure or a combination thereof. In such an embodiment, the first structure and the second structure can be spaced apart from each other such that the first structure attaches to the heat exchanger adjacent a first side of the heat exchanger and the second structure attaches to the heat exchanger adjacent a second side of the heater exchanger, the second side being opposite the first side.

DETAILED DESCRIPTION OF THE PREFERRED EMBODIMENT

Figure 1:
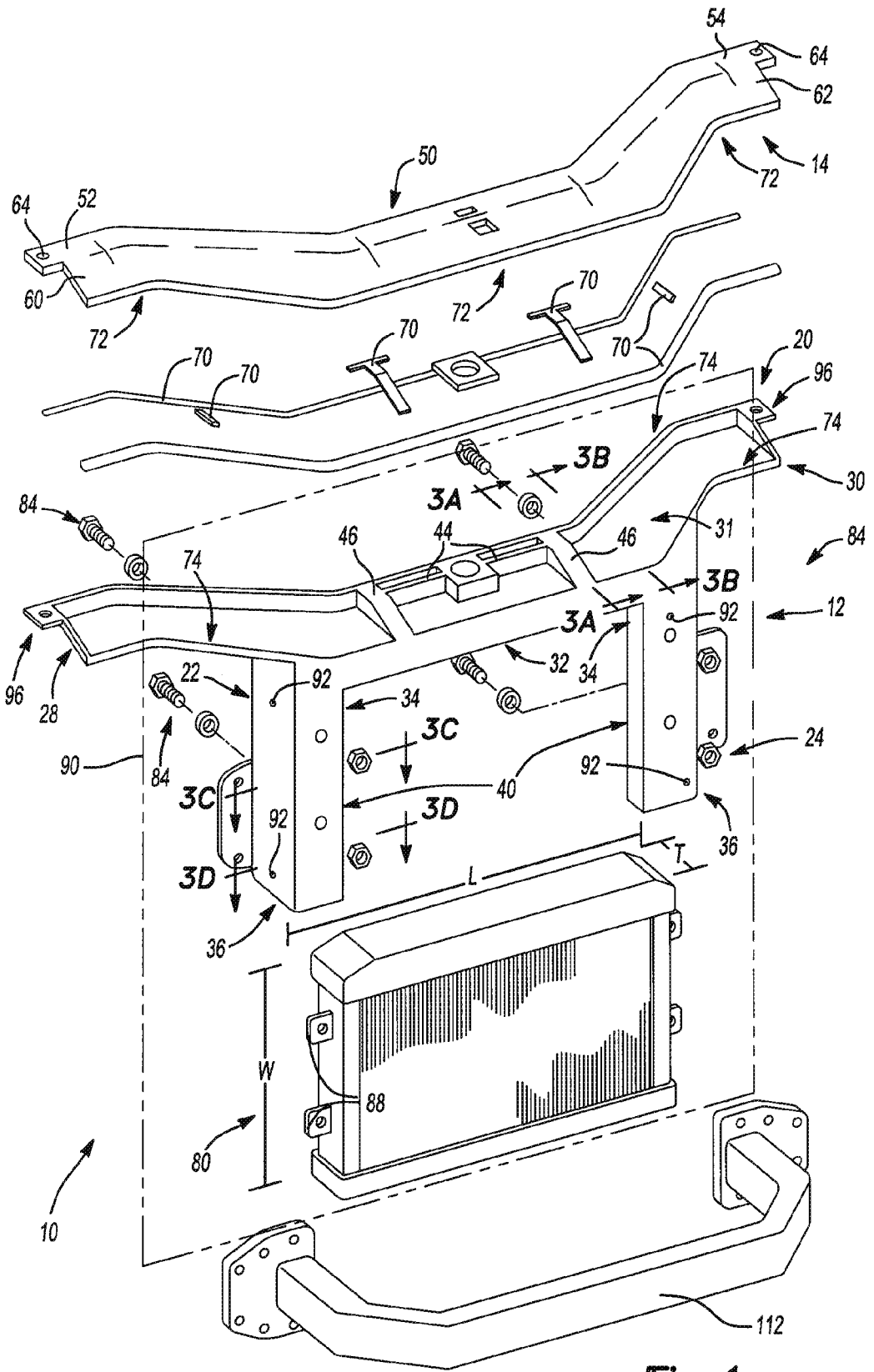
FIG. 1 is an exploded perspective view of an exemplary front end modular assembly according to an aspect of the present invention.

The present invention is predicated upon the provision of a modular assembly suitable for attachment to a transportation vehicle. The modular assembly may be attached to various portions of a vehicle, however, it is particularly suited for attachment to a front portion of an automotive vehicle such as a sedan, a convertible, a mini-van, a sport utility vehicle (SUV) or the like such that the assembly is part of a front end of the automotive vehicle. The modular assembly typically includes one or any combination, of the following:

1) a carrier that includes a cross-vehicle structure and at least one, but preferably a first and second structure extending outwardly from the cross-vehicle structure;
2) a cross-vehicle reinforcement that is preferably configured to be substantially coextensive with the cross-vehicle structure of the carrier; and
3) a heat exchanger that is part of the HVAC system of an automotive vehicle; and/or
4) a bumper member.

It is additionally contemplated that other components such as a brackets, fasteners, locators, gaskets, seals, combinations thereof or the like may be included in the assembly.

The present invention is also predicated upon a methodology of forming the modular assembly, attaching the modular assembly to a vehicle or both. The methodology typically includes at least two, but can include any combination, of the following steps:

1) forming the carrier to include one or more open spaces and one or more integrated reinforcement structures;
2) attaching the carrier to the reinforcement with an adhesive;
3) attaching the heat exchanger to the carrier with an adhesive, welds, mechanical fasteners or a combination thereof;
4) attaching the first and second structure of the carrier to the bumper member and/or the heat exchanger with an adhesive, mechanical fasteners, welds or a combination thereof; and
5) attaching the modular assembly to an automotive vehicle such that the carrier connects to upper rails of the vehicle and the first and second structures of the carrier connect to lower rails of the vehicle.

Referring to FIGS. 1-3E, there is illustrated an exemplary front end modular assembly or module 10 in accordance with the present invention. The illustrated assembly 10 includes a carrier 12 and a reinforcement 14.

Generally, the carrier of the module will include a cross-vehicle structure and a first and second structure extending outwardly from the cross-vehicle structure. The cross-vehicle structure is typically designed to extend from one side of the vehicle to the other side of the vehicle (e.g., from adjacent one front quarter panel to adjacent an opposite front quarter panel). The cross-vehicle structure will typically be continuous as it extends cross-vehicle although it could be in separate pieces and could intermittently extend cross-vehicle. It is also generally preferred, although not necessarily required, that the first and second structure and particularly the distal ends of the first and second structure be configured for direct or indirect attachment to lower vehicle rails on opposite sides of the vehicle.

The carrier, including any combination of the first structure, the second structure and the cross-vehicle structure, can be designed to include one or more integrated reinforcement structures. Examples of such reinforcement structures include, without limitation, ribs (e.g., planar or channel forming ribs), walls, contours, combination thereof or the like. Such integrated reinforcement structures can be formed of the same material as the rest of the first structure, the second structure and/or the cross-vehicle structure or may be formed separately of a different material and attached to the structure of the carrier with adhesives, mechanical fasteners, welds or the like.

Figure 2:
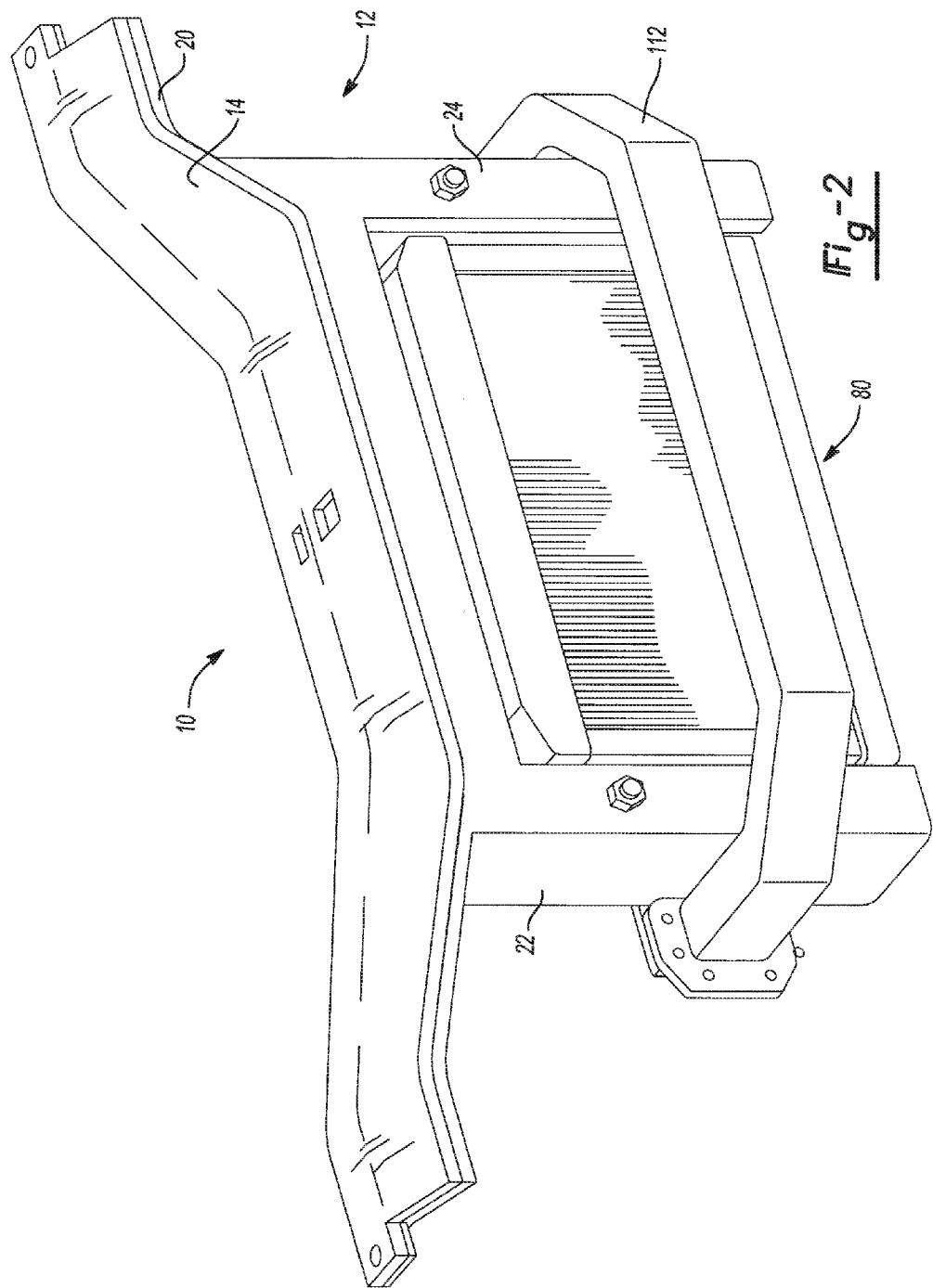
FIG. 2 is an assembled perspective view of the exemplary front end modular assembly of FIG. 1.
Figure 3A:
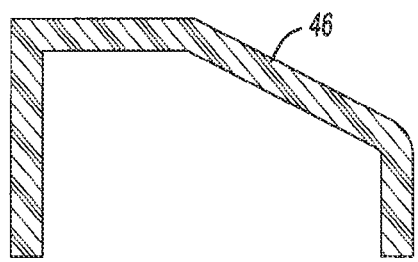
FIGS. 3A, 3B, 3C and 3D respectively, illustrates cross-sections 3A-3A, 3B-3B, 3C-3C and 3D-3D of the modular assembly of FIG. 2.
Figure 3B:
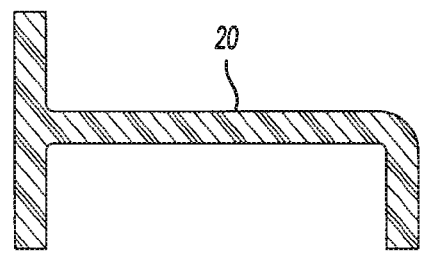
Figure 3C:
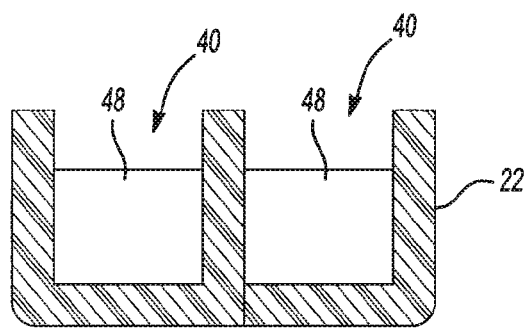
Figure 3D:
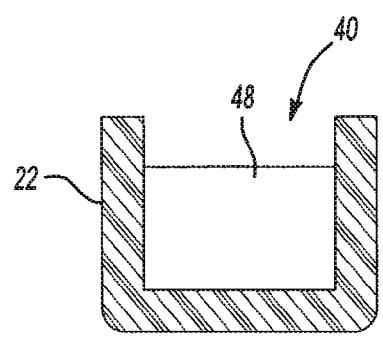
Figure 3E:
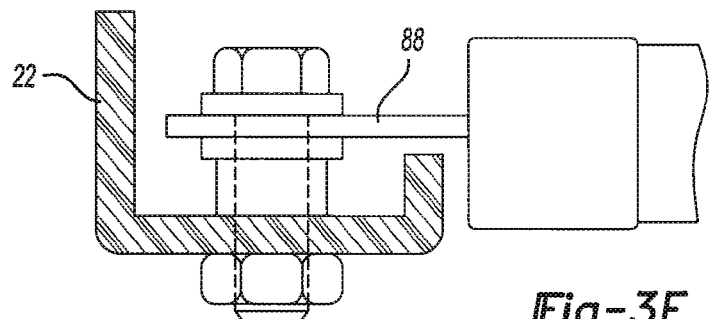
FIG. 3E illustrates an exemplary attachment for attaching a heat exchanger to or as part of the assembly.
Figure 4:
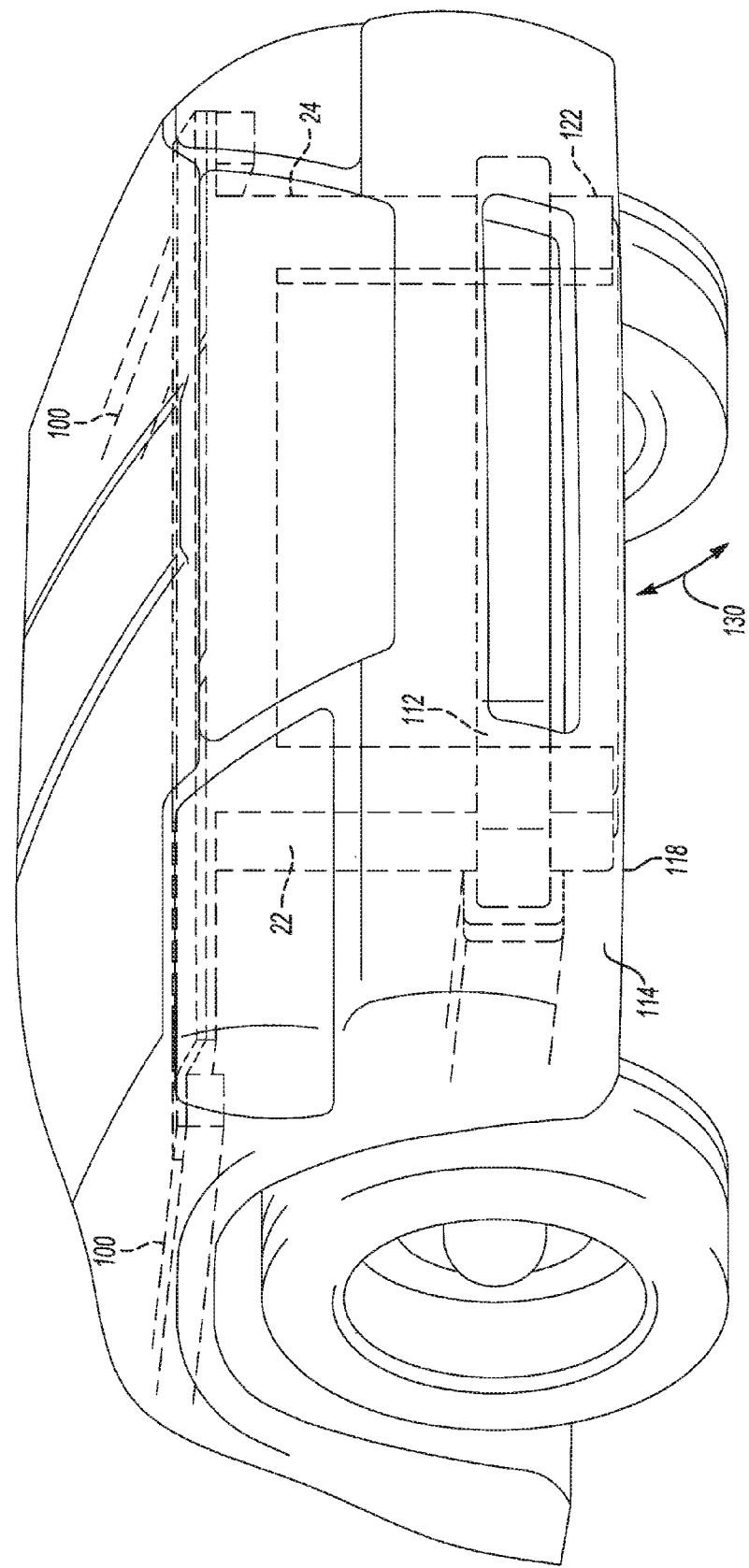
FIG. 4 illustrates the modular assembly of FIGS. 1-3D assembled to a vehicle.

In FIGS. 1-3, the carrier 12 includes a cross-vehicle structure 20. The carrier 12 also includes a first downwardly extending structure 22 and a second downwardly extending structure 24, both of which extend outwardly from the cross-vehicle structure 20.

The cross-vehicle structure 20 includes a first distal end portion 28 opposite a second opposite distal end portion 30 and an intermediate portion 32 interconnecting the first and second distal portions 28, 30. In the embodiment shown, the first and second distal portions 28, 30 are configured to be adjacent first and second front or forward quarter panels upon assembly of the module to the vehicle. The cross-vehicle structure 20 is also shown to define an opening that is shown as a cavity 31 that extends along at least part of the cross-vehicle structure 20, but more typically along substantially the entirety (e.g., along at least 70%, 80% or more) of the cross-vehicle structure 20.

The first structure 22 and second structure 24 are each shown to extend from a proximate end 34 to a distal end 36 thereof and to connect to the intermediate portion 32 at the proximate ends 34 in a manner that spaces the first and second structures 22, 24 apart from each other. In the particular embodiment depicted, the first and second structures 22, 24 each substantially enclose an internal open space 40.

Both the cross-vehicle structure 20 and the first and second structures 22, 24 are illustrated to include integrated reinforcement structures 44, 46, 48. In the particular embodiment illustrated, the integrated reinforcement structures 48 of the first and second structures 22, 24 are shown as ribs that extend from side to side through the open space of the first and second structures. The integrated reinforcement structures 44, 46 of the cross-vehicle structure 20 extend from side to side relative to the cross-vehicle structure 20 or along the cross-vehicle structure 20 as it extends from end 28 to end 30. Moreover, the reinforcement structures 44, 46 extend through the cavity 31. Generally, it is contemplated that the reinforcement structures can be intersecting or non-intersecting.

Generally, it is contemplated that the carrier can be formed of multiple pieces integrated together (e.g., secured to each other with fasteners, welds adhesive or the like) or may be formed as a single unitary structure. Whether supplied in pieces or as a single unitary structure, the carrier may be formed of a single material or multiple materials.

Generally, it is contemplated that the carrier may be formed of a variety of materials such a metal materials (e.g., metal alloys, metal containing materials, pure metals or the like), polymeric materials (e.g., plastics), other materials, combinations thereof or the like. In one preferred embodiment, the carrier of the present invention is made partially, substantially entirely (e.g., at least 80%, 90%, 95% or more by weight) or entirely from polymeric and/or plastic material, and more preferably thermoplastic material. Thus, the carrier, including each of the first structure, the second structure, the cross-vehicle structure, any integrated reinforcement structures or any subset thereof, can be formed of a single unitary polymeric material and each of the components can be integrally molded of the material.

In a particularly preferred embodiment, the carrier is made from a high strength thermoplastic resin selected from styrenics, polyamides, polyolefins, polycarbonates, polyesters or mixtures thereof. Still more preferably, the resin is selected from the group consisting of acrylonitrile butadiene styrene, polycarbonate/acrylonitrile/butadiene styrene, polycarbonate, polyphenylene oxide/polystyrene, polybutylene terephthalate, polyphenylene oxide, polyphenylene ether, syndiotactic polystyrene, ethylene alpha olefin, polybutylene terephthalate/polycarbonate, polyamide (e.g., nylon), polyesters, polypropylene, polyethylene, polyethylene terephthalates, mixtures, alloys and blends thereof.

It is contemplated that the plastic material for making the carrier may be provided as neat resins, blends or otherwise. Moreover, the polymeric materials may incorporate natural, mineral, fibrous or other fillers of various shapes and sizes for providing reinforcing, stiffening or other characteristics to the frames or structures.

The plastics or polymeric material for one or more components of the carrier may comprise a homopolymer, for example a polyolefin, a polyamide, a polyphenylene oxide and polystyrene, or a copolymer, for example a polyalkylene terephthalate.

Moreover, the plastic or polymeric material may be a thermosetting plastic resin. For example, a polyurethane system may be employed for forming the first structure.

The plastic or polymeric material may contain fibre, for example short glass fibre, long glass fibre, short natural fibre or long natural fibre. Other preferred plastic materials may include talc, minerals or the like. Advantageously, it has been found that relatively long glass fibers add a relatively high degree of strength. Thus, in preferred embodiments, a polymeric material such as ABS, PC\ABS, polypropylene, another suitable plastic or combinations thereof is filled with glass fibers having an average length of approximately greater than 2 mm, more preferably greater than about 4 mm even more preferably greater than about 6 mm and most preferably between about 8 mm and 20 mm.

It is possible to form the carrier using various techniques for the fabrication or shaping of the material selected. Thus, for example, the carrier may be formed, molded, machined or otherwise configured to the desired shape. Metal structures may be roll formed, cast, stamped or the like.

Where the carrier is or includes polymeric (e.g., plastic) materials, it is possible to use any suitable plastic fabrication technique including, without limitation, injection molding (including but not limited to external or internal gas injection molding), blow molding, compression molding, rotational molding, thermoforming, extruding, vacuum forming, foaming-in-place, or otherwise. Accordingly, as can be appreciated, in one embodiment, hybrid structures can be fabricated, thereby taking advantage of the benefits of different respective materials and different respective fabrication techniques, and also advantageously permitting for the ability to design additional features.

For thermosetting materials, any suitable forming techniques may be used. For example, reaction injection molding (RIM) techniques may be employed. Preferred RIM techniques might include structural reaction injection molding (SRIM), reinforced reaction injection molded (RRIM), low density reaction injection molded (LD-RIM) (which may be reinforced or structural) or the like. Alternative techniques such as resin transfer molding (RTM) may also be employed.

Fillers appropriate for RIM (e.g., RRIM or LD-RRIM) materials include, without limitation, mineral quasi-isotropic particles such as mica or wollastonite having various aspect ratios. Structures suitable for RIM (e.g., SRIM or LD-RIM) materials include, without limitation, spray-up fiber preforms, oriented fiber preforms, random fiber preforms, or single or multiple fiber reinforcing layers preplaced in the manufacturing tools prior to injection of the resin.

The cross-vehicle reinforcement, shown as 14 in FIGS. 1-3, can have a variety of configurations. It can be provided as a single piece or in multiple pieces. When provided as multiple pieces, the pieces can be attached to each other or can be separate. Whether provide as a single piece or multiple pieces, it is preferable, although not necessarily required, for the reinforcement to extend cross-vehicle from one side of the vehicle to another side of the vehicle (e.g., from adjacent one front quarter panel to adjacent an opposite front quarter panel). It is also generally preferable for the reinforcement to be configured for direct or indirect attachment to upper vehicle rails on opposite sides of the vehicle.

While it is contemplated that the cross-vehicle reinforcement and the carrier could be integrally formed of the same material, it is preferable that the reinforcement and the carrier are separate components that be joined or attached to each other with attachments such as mechanical fasteners, adhesives, welds, combinations thereof or the like. As such, it is also preferred that the reinforcement and the carrier be formed of different materials.

In FIGS. 1-3E, the reinforcement 14 is shown as a panel that is configured to be substantially coextensive with the cross-vehicle structure 20 of the carrier 12. Both the reinforcement 14 and the cross-vehicle structure 20 of the carrier 12 are illustrated as being generally U-shaped. As shown, like the cross-vehicle structure 20, the reinforcement 14 includes an intermediate portion 50 with arms 52, 54, extending upwardly and outwardly therefrom.

In the illustrated embodiment, the cross-vehicle reinforcement 14 includes a first distal end portion 60 opposite a second opposite distal end portion 62 and the intermediate portion 50 interconnecting the first and second distal portions 60, 62. The reinforcement 14 also includes attachments 64 shown as brackets suitable for attaching the reinforcement 14 to the vehicle.

Generally, it is contemplated that the cross-vehicle reinforcement may be formed of a variety of materials such a metal material (e.g., metal alloys, metal containing materials, pure metals or the like), polymeric materials (e.g., plastics), other materials, combinations thereof or the like. As such, it is contemplated that the cross-vehicle reinforcement may be formed of any of the materials and using any of the forming techniques discussed herein. Preferably, the cross-vehicle reinforcement is formed of a single unitary polymeric or metal material and can be integrally formed of the material. Alternatively, the cross-vehicle reinforcement can be formed of multiple pieces and multiple pieces.

In one preferred embodiment, the cross-vehicle reinforcement of the present invention is made partially, substantially entirely (e.g., at least 80%, 90%, 95% or more by weight) or entirely from a metal material. Examples of suitable metals that can be included in the metal materials include steel, titanium, iron, magnesium, aluminum, combinations thereof or the like. In one preferred embodiment, the metal material that forms the second structure, the third structure or both are at least 50% by weight metal, more typically at least 70% by weight metal and even more typically at least 90% by weight metal. Preferred forming techniques, which may be employed for shaping the second and third structures include, without limitation, casting, stamping, roll forming, hydroforming or the like. For such components, it may be desirable to apply corrosion inhibitor (e.g., e-coat) thereto depending upon when the module is assembled to the vehicle.

Generally, it is contemplated that the carrier, particularly the cross-vehicle structure, may be directly or indirectly attached to the cross-vehicle reinforcement. Moreover, various attachments may be used for securing the reinforcement and carrier together. Examples of such attachments include, without limitation, mechanical fasteners (e.g., clips, screws, rivets, nuts and bolts, interlocking devices, combinations thereof or the like), adhesives, welds (e.g., from vibration welding, spot welding, RF welding or the like), other attachments, combinations thereof or the like.

In a preferred embodiment, the carrier, particularly the cross-vehicle structure, is attached or secured to the reinforcement with adhesive substantially without the aid of any other attachments. In such an embodiment, the carrier is attached or secured to the cross-vehicle reinforcement with less than 20, more typically less than 10, even more typically less than 5 welds, mechanical fasteners and/or other non-adhesive attachments. The carrier can also be attached or secured to the cross-vehicle reinforcement without any welds, mechanical fasteners and/or other non-adhesive attachments.

Attachment of the cross-vehicle reinforcement to the cross-vehicle structure preferably creates a closed section having a substantially enclosed internal open space. Such a closed section can be formed by providing the reinforcement, the cross-vehicle structure or a combination thereof with one or more cavities that become substantially enclosed upon attachment of the reinforcement to the cross-vehicle structure of the carrier of reinforcement carrier or both.

In FIGS. 1-3E, the cross-vehicle reinforcement 14 is secured to the cross-vehicle structure 20 with adhesive 70 thereby enclosing the cavity 31 of the cross-vehicle structure and creating a substantially enclosed open space between the cross-vehicle reinforcement 14 and cross-vehicle structure 20. As shown, peripheral edges or regions of the cross-vehicle reinforcement 14 provide corresponding surfaces 72 that are adhesively secured to corresponding surfaces 74 formed at peripheral edges or regions of the cross-vehicle structure 20. The cross-vehicle reinforcement 14 is also adhesively secured to the integrated reinforcement structures 44, 46 of the cross-vehicle structure 20 such that the integrated reinforcement structures 44, 46 extend through the open space between the reinforcement 14 and the cross-vehicle structure 20.

When used, any suitable adhesive may be employed in the present invention, although particular adhesives are preferred Multiple different adhesives may be used as well. Preferably, the adhesive is compatible with (i.e., capable of adhering to) the material of the surfaces of the structures. If, however, the adhesive is slightly incompatible with one of these materials, it may be desirable to treat the surface[s] formed of the incompatible material. Exemplary treatments include the application of primer, exposure to plasma, combinations thereof or the like. The adhesive can be a urethane based adhesive, and more preferably a urethane adhesive. Alternatively, the adhesive may include a functional component selected from acrylonitrile butadiene styrene (ABS), polycarbonate (PC), or a mixture thereof (e.g. PC-ABS). The adhesive can additionally or alternatively be a silane adhesive, a silicone adhesive or a mixture thereof. An acrylic adhesive may be additionally or alternatively be employed. The adhesive may also be epoxy based. It may include polyolefinics, styrenics, acrylics or mixtures thereof. In one embodiment, a preferred adhesive includes alkyl borane. Examples of suitable adhesives are disclosed in commonly owned U.S. patent Ser. No. 09/466,321 (filed Dec. 17, 1999) and patent publication numbers 20020058764 and 20030001410 expressly incorporated herein by reference for all purposes. Any such adhesive may include suitable performance modifiers including art disclosed tackifiers, elastomers, impact modifiers, or the like.

In one embodiment, a two part, organoborane/amine complex adhesive or other adhesive is employed for adhesively securing the structures together. Advantageously, such an adhesive can adhere to low surface energy surfaces or substrates. As such, the adhesive is preferably capable of bonding to corresponding surfaces having a surface energy of less than 45 mJ/m$^2$.

Adhesives, polymerizable compositions and method of use disclosed in International Patent Application No. PCT/US00/33806, incorporated herein by reference, are especially preferred for use in the present invention to bond the structures.

Once the adhesive has been applied, it will typically require some amount of time to cure (e.g., part cure, full cure, cure on demand, air cure, heat cure, moisture cure, chemical cure, radiation cure, or the like). Preferably, the adhesive cures at about room temperature (e.g., between about 20° C. to about 30° C.), but may be exposed to elevated or lowered temperatures for accelerating or slowing cure times. During cure, it may be desirable to employ a device (e.g., push-pins, clamps, clips or the like) for holding the frames and/or structures together. Such fasteners may be removable or may be intended to assist in securing the structures together during use of the module.

Additionally or alternatively, the surfaces or other portions of the structures that are adhered together may be formed (e.g., molded) to have interfitting and/or interlocking features for attaching the structures together during adhesive cure or any other time. For example, a corresponding surface of one structure may include one or more openings (e.g., cavities) for receiving one or more protrusions of a corresponding surface of another structure.

The front end module of the present invention may additionally include one or more heat exchangers (e.g., a radiator, a condenser or both) of the heating, ventilating and air conditioning (HVAC) system of the vehicle. Advantageously, the heat exchanger can be assembled to a location between the first and second outwardly extending structures of the carrier without impediment from any member (e.g., cross-tie member) that might otherwise interconnect the outwardly extending structures.

Typically, when included in the module prior to assembly to the vehicle, the heat exchanger is located between the first and second outwardly extending structures of the carrier and is secured to the first and second structures and/or the cross-vehicle structure with attachments such as mechanical fasteners, welds, adhesives, combinations thereof or the like. Preferably, upon assembly, one or more upper edges of the one or more heat exchangers are located adjacent the proximate ends of the first and second structures and one or more lower edges of the one or more heat exchangers are located adjacent the distal ends of the first and second structures.

In FIGS. 1 and 2, a heat exchanger 80, which includes the radiator, the condenser or both of the vehicle, is shown to be substantially planar and substantially rectangular. As shown, the heat exchanger 80 has a length (L), a width (W) and a thickness (T).

As is illustrated in FIGS. 1 and 2, the heat exchanger 80 is located between the first structure 22 and the second structure 24 to assemble the heat exchanger 80 to the carrier 12 of the module 10. Thereafter, mechanical fasteners 84 shown as bolt attachments (e.g., nut and bolt assemblies) are fastened to the first and second structures 22, 24 and flanges 88 of the heat exchanger 80.

Generally, the heat exchanger 80 can, prior to assembly of the module to the vehicle, be brought between the first and second structures from the front, the rear, from below or any combination thereof relative to the carrier. However, in the embodiment shown, it can be seen that the heat exchanger 80 can remain substantially within a plane defined by the first and second structures 22, 24 as the heat exchanger 80 is move to and from between the structures 22, 24. In particular, FIG. 1 shows a plane 90 defined by points 92 located at the proximate ends 34 and distal ends 36 of the structures 22, 24 and the heat exchanger 80 can be moved such that the length (L) and width (W) of the heat exchanger 80 substantially continuously lie in that plane 90 as the heat exchanger is placed in between the structures 22, 24 or removed from between the structures 22, 24. This is allowed for because the space between the first and second structures is unobstructed by any member that might otherwise extend between the structures 22, 24. Such ability can be particularly useful for servicing of the heat exchanger after assembly of the module to the vehicle as is further discussed below.

The module can be assembled to the vehicle through securement of the module to various portions of the vehicle with attachments such as mechanical fasteners, adhesives, welds, combinations thereof or the like. Preferably, the module is directly or indirectly secured to upper rails, lower rails or both of the frame of the vehicle, although not specifically required unless otherwise stated. The module can be assembled to the vehicle with the heat exchanger as part of the module or the heat exchanger may be attached to the carrier after assembly of the module to the vehicle.

With reference to FIGS. 1-4, mechanical fasteners 64, 96, shown as brackets, are employed to attach the cross-vehicle reinforcement 14, the cross-vehicle structure 20 or both directly or indirectly (e.g., through connection to the fender and/or fender reinforcement) to the upper rails 100 of the vehicle. The mechanical fasteners 64, 96 can be mechanically fastened, adhesively secured, welded or a combination thereof to the rails 100, the reinforcement 14 and/or the structure 20 or the fasteners 64, 96 may be integrally formed with and of the same materials as one or more of these components.

A bumper member 110, which can include a bumper structural member 112 (e.g., a bumper beam), a bumper fascia 114 or both, can be attached to the first and second structures 22, 24. In the embodiment shown, a portion shown as a lower edge 118 of the fascia 114 is attached to the first and second structures 22, 24 and particularly adjacent the distal ends 36 of the structures 22, 24 with mechanical fasteners 122 shown as brackets. Like with the other fasteners, The mechanical fasteners 122 can be mechanically fastened, adhesively secured, welded or a combination thereof to the structures 22, 24 and the bumper member 110 (e.g., the fascia 114) or the fasteners 122 may be integrally formed with and of the same materials as one or more of these components. The bumper member 110 and particularly the bumper structural member 112 will typically connect the structures 22, 24 to lower rails of the vehicle (e.g., by connection to the fascia).

It is generally contemplated that the bumper member 110 could be included as part of the module prior to assembly of the module to the vehicle. The bumper member 110 may also be attached to the module during and/or after assembly of the module to the vehicle. In the embodiment depicted, a flange 111 extends outwardly from each of the structures 22, 24. The flange 111 can be attached via fasteners, adhesive or otherwise to the bumper member 110 preferably at the ends of the bumper member 110.

As can be seen, the heat exchanger 80 is suspended by the carrier 12. Moreover, the first structure 22 is without attachment to the second structure 24, before or after assembly of the module to the vehicle, other than by the heat exchanger 80, the bumper member 110, the intermediate portion 32 or a combination thereof. In particular, the first structure is without connection to the second structure by any separate or integral lower tie bar. As, discussed above, the heat exchanger 80 can advantageously be removed from between the structures 22, 24 while substantially remaining in the plane 90 defined by the structures 22, 24, which allows removal of the heat exchanger 80 from the bottom 130 of the vehicle during servicing of the vehicle.

It is additionally contemplated that further reinforcements, particularly metal reinforcements may be integrated with the module. Such reinforcement may be attached to the components of the module using a variety of techniques such as mechanical fastening, adhesion, melt fastening (e.g., welding). As one example, one or more reinforcements can be adhered using any adhesive described herein to the structures 22, 24 adjacents the locations at which the heat exchanger is attached to those structures 22, 24. In on preferred embodiment, a metal reinforcement is adhered to each of the structures 22, 24 to cooperatively enclose an open space with those structures. In this embodiment or any of the embodiments described herein, the reinforcements can additionally be welded or otherwise attached to the cross-vehicle reinforcement 14.

It is also contemplated that the cross-vehicle reinforcement 14 could be configured to attached directly or indirectly to the lower rails of the vehicle. In such an embodiment, the end portions of the reinforcement 14 would likely extend downward from the central portion of the reinforcement 14. In such an embodiment, the end portions of the reinforcement 14 may diverge from the end portions of the cross-vehicle structure of the carrier such that the carrier can still be attached at locations previously described. Wherever the reinforcement 14 is attached, it is preferable that the reinforcement 14 be able to transfer loads from, for example, the latch mechanism or otherwise to the components (e.g., the rails) to which the reinforcement 14 is ultimately attached.

Unless stated otherwise, dimensions and geometries of the various structures depicted herein are not intended to be restrictive of the invention, and other dimensions or geometries are possible. Plural structural components can be provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A front end module for an automotive vehicle, comprising:
    a carrier that includes:
        a. a cross-vehicle structure,
        b. a first downwardly extending structure, and
        c. a second downwardly extending structure, wherein:
            i. the cross-vehicle structure includes a first distal end portion opposite a second opposite distal end portion and an intermediate portion interconnecting the first and second distal portions;
            ii. the first and second distal end portions are adjacent first and second front quarter panels upon assembly of the module to the vehicle;
            iii. the first structure and second structure each extend from a proximate end to a distal end thereof; and
            iv. the first and second structures are connected to the intermediate portion at the proximate ends of the first and second structures so as to space the first and second structures apart; and
        d. a reinforcement member substantially entirely formed of a metal material and attached to the cross-vehicle structure such that an open space is formed and enclosed between the reinforcement member and the cross-vehicle structure,
    wherein the first downwardly extending structure and the second downwardly extending structure each are generally U-shaped and include an internal open space, and
    wherein a heat exchanger can be added and removed from the bottom of the vehicle so that the heat exchanger remains in a plane defined by the first downwardly extending structure and the second downwardly extending structure.

2. A module as in claim 1 wherein the carrier is configured to suspend the heat exchanger from the first structure, the second structure, or a combination thereof.

3. A module as in claim 2 wherein the first structure and the second structure are spaced apart from each other such that the first structure attaches to the heat exchanger adjacent a first side of the heat exchanger and the second structure attaches to the heat exchanger adjacent a second side of the heater exchanger, the second side being opposite the first side.

4. A module as in claim 2 wherein attachments attach the heat exchanger to the first structure and the second structure and the heat exchanger is removable and attachable from the vehicle by the attachments only.

5. A module as in claim 1 wherein the reinforcement member is attached to the cross vehicle structure such that a cavity of the cross-vehicle structure, a cavity of the reinforcement member, or both is formed into the open space, and the open space is a substantially enclosed tunnel between the cross-vehicle structure and the reinforcement member.

6. A module as in claim 1 wherein the carrier is formed of an injection molded or compression molded plastic and the carrier is formed substantially entirely of a plastic that comprises a long glass fibre polypropylene.

7. A module as in claim 1 wherein the reinforcement member includes a metal corresponding surface and the cross-vehicle structure includes a plastic corresponding surface and the corresponding surface of the reinforcement member is adhesively secured to the corresponding surface of the cross-vehicle structure.

8. A module as in claim 1 wherein the carrier is formed substantially entirely of a plastic that includes a reinforcement material selected from a fiber and a mineral.

9. A module as in claim 1 wherein the first structure is indirectly attached to the second structure, before or after assembly of the module to the vehicle, by only a heat exchanger, a bumper member, the intermediate portion, or a combination thereof.

10. A module as in claim 1 wherein the first structure is free of a connection to the second structure by a separate lower tie bar or an integral lower tie bar.

11. A front end module as in claim 1, wherein the intermediate portion of the cross-vehicle structure includes integrated reinforcement structures that extend through the open space between the reinforcement member and the cross-vehicle structure so that the reinforcement member and the cross-vehicle structure are adhesively secured together.

12. A front end module for an automotive vehicle, comprising:
 a. a carrier that includes a cross-vehicle structure,
 b. a first downwardly extending structure, and
 c. a second downwardly extending structure, wherein:
  i. the cross-vehicle structure includes a first distal end portion opposite a second distal end portion and an intermediate portion interconnecting the first and second distal portions;
  ii. the first and second distal end portions are configured to be adjacent first and second front quarter panels upon assembly of the module to the vehicle;
  iii. the first structure and second structure each extend from a proximate end to a distal end thereof with the first and second structures extending outwardly from the intermediate portion;
  iv. the first and second structures are connected to the intermediate portion at the proximate ends so as to space the first and second structure apart;
  v. the first and second structures each are generally U-shaped and substantially enclose an internal open space and a plurality of intersecting ribs of each of the first and second structures extend through the open space;
  vi. the first structure and the second structure are spaced apart from each other such that the first structure attaches to a heat exchanger adjacent a first side of the heat exchanger and the second structure attaches to the heat exchanger adjacent a second side of the heat exchanger, the second side being opposite the first side; and
  vii. the carrier, including the cross-vehicle structure, the first structure and the second structure are formed of a single unitary molded polymer material; and
 d. a reinforcement member substantially entirely formed of metal material and attached to the cross-vehicle structure such that an open space is formed and enclosed between the reinforcement member and the cross-vehicle structure;
 wherein the reinforcement member and the cross-vehicle structure include corresponding surfaces that are-adhesively secured to each other; and
 wherein a heat exchanger can be added and removed from the bottom of the vehicle so that the heat exchanger remains in a plane defined by the first downwardly extending structure and the second downwardly extending structure.

13. A module as in claim 12 wherein the first structure is indirectly attached to the second structure, before or after assembly of the module to the vehicle, by only the heat exchanger, a bumper member, the intermediate portion, or a combination thereof.

14. A module as in claim 12 wherein the first structure is free of a connection to the second structure by a separate lower tie bar or an integral lower tie bar.

15. A module as in claim 12 wherein the molded polymer material is formed substantially entirely of a plastic that comprises a homopolymer selected from a polyolefin, a polystyrene and a polyamide or a copolymer.

16. A module as in claim 12 wherein the molded polymer material is formed substantially entirely of a plastic that includes a reinforcement material selected from a fiber and a mineral.

17. A module as in claim 12 wherein attachments attach the heat exchanger to the first structure and the second structure and the heat exchanger is removable and attachable from the vehicle by the attachments only.

18. A front end module for an automotive vehicle, comprising:
 a. a carrier that includes a cross-vehicle structure,
 b. a first downwardly extending structure, and
 c. a second downwardly extending structure, wherein:
  i. the cross-vehicle structure includes a first distal end portion opposite a second opposite distal end portion and an intermediate portion interconnecting the first and second distal portions;
  ii. the first and second distal end portions are configured to be adjacent first and second front quarter panels upon assembly of the module to the vehicle;
  iii. the first structure and second structure each extend from a proximate end to a distal end thereof;
  iv. the first and second structures are connected to the intermediate portion at the proximate ends so as to space the first and second structure apart;
  v. the first and second structures extend outwardly from the intermediate portion;
  vi. the first and second structures each are generally U-shaped and substantially enclose an internal open space and a plurality of intersecting ribs of each of the first and second structures extend through the open space;
  vii. the carrier, including the cross-vehicle structure, the first structure and the second structure are formed of a single unitary molded polymer material;
  viii. each of the first structure and second structure include an attachment feature located at the distal ends thereof configured for attachment to a bumper member upon assembly of the module to the vehicle;
  ix. the first structure is indirectly attached to the second structure, before or after assembly of the module to the vehicle, by only a heat exchanger, the bumper member, the intermediate portion, or a combination thereof; and
  x. the first structure is free of a connection to the second structure by a separate lower tie bar or an integral lower tie bar;
 d. a cross-vehicle reinforcement member substantially entirely formed of metal material and attached to the cross-vehicle structure such that an open space is formed and enclosed between the reinforcement member and the cross-vehicle structure;

wherein the reinforcement member includes a metal corresponding surface and the cross-vehicle structure includes a plastic corresponding surface and the corresponding surface of the reinforcement member is adhesively secured to the corresponding surface of the cross-vehicle structure; and wherein a heat exchanger can be added and removed from the bottom of the vehicle so that the heat exchanger remains in a plane defined by the first downwardly extending structure and the second downwardly extending structure.

19. A module as in claim 18 wherein the carrier is configured to suspend the heat exchanger from the first structure, the second structure, or a combination thereof.

20. A front end module as in claim 19 wherein the first structure and the second structure are spaced apart from each other such that the first structure attaches to the heat exchanger adjacent a first side of the heat exchanger and the second structure attaches to the heat exchanger adjacent a second side of the heater exchanger, the second side being opposite the first side.

* * * * *